(12) United States Patent
Hanusiak et al.

(10) Patent No.: US 10,248,668 B2
(45) Date of Patent: Apr. 2, 2019

(54) MAPPING DATABASE STRUCTURE TO SOFTWARE

(71) Applicant: International Business Machines Corporation, Armonk, NY (US)

(72) Inventors: Tomasz Hanusiak, Czarny Dunajec (PL); Konrad Wojciech Komnata, Cracow (PL); Jaroslaw Osinski, Mrozy (PL); Grzegorz Szczepanik, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 15/212,772

(22) Filed: Jul. 18, 2016

(65) Prior Publication Data

US 2018/0018365 A1 Jan. 18, 2018

(51) Int. Cl.
*G06F 17/30* (2006.01)
(52) U.S. Cl.
CPC .. *G06F 17/30292* (2013.01); *G06F 17/30607* (2013.01)
(58) Field of Classification Search
CPC ......... G06F 17/30424; G06F 17/30864; G06F 17/30292; G06F 17/30607
USPC ........................................................ 707/770
See application file for complete search history.

(56) References Cited

U.S. PATENT DOCUMENTS

| 6,341,289 B1 * | 1/2002 | Burroughs | G06F 17/30607 707/737 |
| 6,360,334 B1 * | 3/2002 | Kavanagh | G06F 8/61 707/999.006 |
| 7,251,599 B2 * | 7/2007 | Maison | G10L 15/18 704/251 |
| 7,970,745 B2 * | 6/2011 | Norcott | G06F 17/30309 707/694 |
| 8,335,786 B2 * | 12/2012 | Pereira | G06F 17/30784 707/728 |
| 8,499,281 B2 * | 7/2013 | Ahadian | G06F 8/75 707/617 |
| 8,966,451 B2 * | 2/2015 | Pastorelli | G06F 9/466 707/704 |

(Continued)

FOREIGN PATENT DOCUMENTS

| WO | WO-9503586 A1 * | 2/1995 | ............... G06F 8/24 |
| WO | WO-9917232 A1 * | 4/1999 | ....... G06F 17/30595 |

OTHER PUBLICATIONS

CA Client Automation—12.9, "How to Create a Custom Software Signature", CA Technologies Documentation, Last updated Dec. 11, 2015, 11 pages. (Year: 2015).*

(Continued)

*Primary Examiner* — Phuong Thao Cao
(74) *Attorney, Agent, or Firm* — Jay Wahlquist

(57) ABSTRACT

A first set of metadata may be received, via a network, which includes structural information about a first database. The structural information may be compared with one or more software signatures. Each software signature may include a software identity that is mapped to one or more associated database structure identities. A first match estimate may be generated based on the comparing of the structural information with the one or more software signatures. It may be inferred that the first database is likely included in a first software product based on the generating of the match estimate.

20 Claims, 6 Drawing Sheets

(56) References Cited

U.S. PATENT DOCUMENTS

| | | | | |
|---|---|---|---|---|
| 8,978,006 | B2* | 3/2015 | Hirsch | G06F 8/71 717/107 |
| 9,189,516 | B2* | 11/2015 | Wilson | H04L 51/12 |
| 9,396,285 | B1* | 7/2016 | Fitterer | G06F 17/30952 |
| 9,646,157 | B1* | 5/2017 | Hou | G06F 21/565 |
| 2003/0084123 | A1* | 5/2003 | Kamel | H04L 12/2805 709/219 |
| 2004/0177075 | A1* | 9/2004 | Rangadass | G06F 17/30563 |
| 2007/0016695 | A1* | 1/2007 | Rabbers | G06F 17/30581 709/248 |
| 2007/0088707 | A1* | 4/2007 | Durgin | G06F 17/30581 |
| 2007/0266139 | A1* | 11/2007 | Guan | H04L 41/0233 709/223 |
| 2008/0065893 | A1* | 3/2008 | Dutta | H04L 9/321 713/176 |
| 2008/0168088 | A1* | 7/2008 | Ahmad | G06F 11/0727 |
| 2011/0093701 | A1* | 4/2011 | Etchegoyen | G06F 21/121 713/165 |
| 2012/0310996 | A1* | 12/2012 | Kulack | G06F 17/30404 707/810 |
| 2013/0086114 | A1* | 4/2013 | Wilson | G06F 17/30575 707/783 |
| 2013/0339284 | A1* | 12/2013 | Rowles | G06Q 30/02 706/46 |
| 2014/0006796 | A1* | 1/2014 | Smith | G06F 21/00 713/187 |
| 2014/0067868 | A1* | 3/2014 | Kemmler | G06F 17/30294 707/796 |
| 2014/0101635 | A1* | 4/2014 | Hoffmann | G06F 8/30 717/106 |
| 2014/0230068 | A1* | 8/2014 | Kundapur | G06F 21/125 726/26 |
| 2014/0297713 | A1* | 10/2014 | Meigen | G06F 8/20 709/203 |
| 2014/0298315 | A1* | 10/2014 | Boudreau | G06F 8/61 717/174 |
| 2016/0224794 | A1* | 8/2016 | Roberts | G06F 21/562 |
| 2016/0254911 | A1* | 9/2016 | Manchepalli | H04L 9/0897 713/193 |
| 2016/0291968 | A1* | 10/2016 | Chen | G06F 8/68 |
| 2017/0103226 | A1* | 4/2017 | Eberlein | G06F 21/6227 |
| 2017/0124121 | A1* | 5/2017 | Fitterer | G06F 17/30292 |
| 2017/0161511 | A1* | 6/2017 | Eberlein | G06F 21/6218 |
| 2017/0249319 | A1* | 8/2017 | Savarkar | G06F 17/30864 |
| 2018/0018365 | A1* | 1/2018 | Hanusiak | G06F 17/30424 |

OTHER PUBLICATIONS

Unknown, "Database Schema Comparison Tool," Altova product: DatabaseSpy, printed Mar. 1, 2016, 1 page. http://www.altova.com/databasespy/database-structure-compare-tool.html.

Unknown, "About the Express Software Identification Database (ESIDA)®," Express Metrix, 2011, pp. 1-5. http://www.expressmetrix.com/pdf/About_the_Express_Software_Identification_Database.pdf.

Unknown, "JD Edwards EnterpriseOne Tools Configurable Network Computing Implementation Guide," E14695-03, Release 8.98, Update 4, Oct. 2013, 212 pages, Oracle Help Center. https://docs.oracle.com/cd/E17984_01/doc.898/e14695/undrstnd_datasources.htm.

Hanusiak et al., "Determining a Database Signature," U.S. Appl. No. 15/477,796, filed Apr. 3, 2017.

List of IBM Patents or Patent Applications Treated as Related, Signed Apr. 3, 2017, 2 pages.

* cited by examiner

MAPPING DATABASE STRUCTURE TO SOFTWARE

BACKGROUND

This disclosure relates generally to database management systems, and more particularly to determining a software identity associated with a database based on the database's structure.

Today, many software products include a database component. For example, when installing a particular banking application, a particular database (e.g., a customized DB2 database) may also have to be installed so that a user has access to a particular record associated with his/her bank account. The structure of a database may be tailored or customized based on the particular software product that is being utilized. For example, the banking application described above may correspond to Bank X and may include a database that has a very specific schema and table column identity layout (e.g., the first column/primary key is a "customer ID" field, the second column is a "Bank X customer name" field, etc.). Therefore, this specific table layout may be unique because it is associated with a particular software product in order to meet that software product's needs.

SUMMARY

One or more embodiments are directed to a computer-implemented method, a system, and a computer program product for determining a software identity based on a database structure. A first set of metadata may be received, via a network, which includes structural information about a first database. The structural information may be compared with one or more software signatures. Each software signature may include a software identity that is mapped to one or more associated database structure identities. A first match estimate may be generated based on the comparing of the structural information with the one or more software signatures. It may be inferred that the first database is likely included in a first software product based on the generating of the match estimate.

Figure 1:
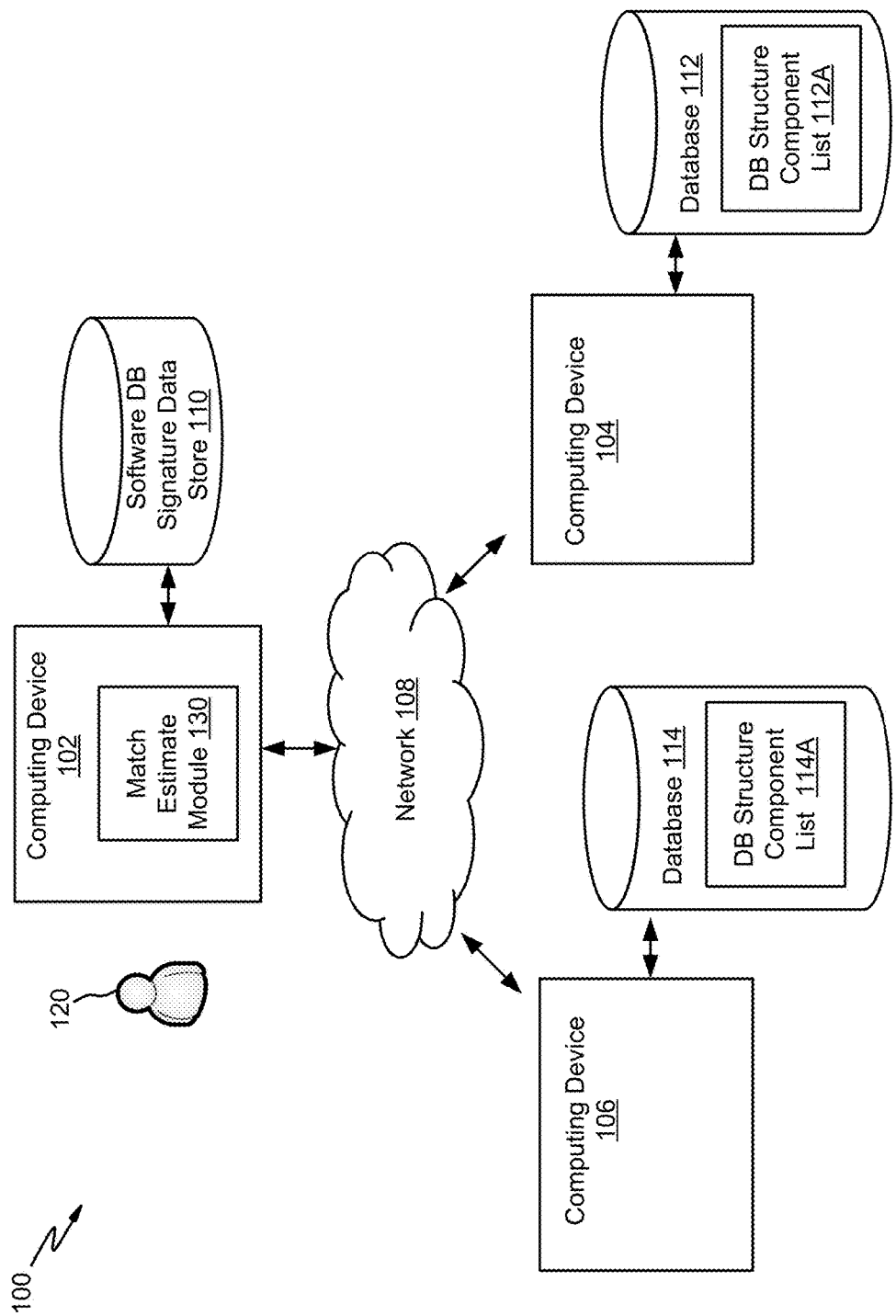
FIG. 1 is a block diagram of a computing environment, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to determining a software identity associated with a database based on the database's structure. While the present disclosure is not necessarily limited to such applications, various aspects of the disclosure may be appreciated through a discussion of various examples using this context.

Because there may be many different types of databases utilized by various software products, it may be hard to determine which software product is associated with a particular database. Knowing which software products are associated with particular databases may useful for network administrators, for example, who may only have access to database structure information and not program product information (e.g., the name and/or version of a program product). An administrator may desire to know the program product information so that the administrator may perform operations and/or remedy a database problem according to the program product being used. Therefore, the administrator may get a better sense of how to perform an operation or remedy a problem by knowing the program to which the database belongs to. For example, the administrator may have to rebuild one or more indexes on a database. In order to know how to organize the indexes, it may be useful to know how the software program product associated with the database organizes or labels its indexes. Various embodiments are thus directed to determining or ascertaining a software identity based on a database's structure.

FIG. 1 is a block diagram of a computing environment 100, according to embodiments. The computing environment 100 may include a computing device 102 (or set of computing devices) this is communicatively coupled (e.g., via the network 108) to the computing devices 106 and/or 104. In some embodiments, the computing environment 100 may be implemented within a cloud computing environment, or use one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 108.

In some embodiments, the computing environment 100 may represent a database cluster environment. The term "database cluster" may refer to two or more compute nodes (e.g., server computing devices). Each compute node (e.g., computing device 106 and 104) includes or is directly associated with a storage device (or devices) that stores a database. The databases associated with the respective compute nodes may be identical, i.e., a single database is replicated on the storage device associated with each compute node. Alternatively, a single database may be partitioned and the databases associated with the respective compute nodes may each contain one of the partitions of the single database. Database clustering may be useful for providing continuous availability of data in case one or more compute nodes or associated databases fail (e.g., because of a failed processor, failed connection path, failed storage device, etc.). When a database fails, a failover operation may be executed such that any database operation that was undertaken but not completed by the failed database is assumed by a different database within another compute node.

Figure 6:
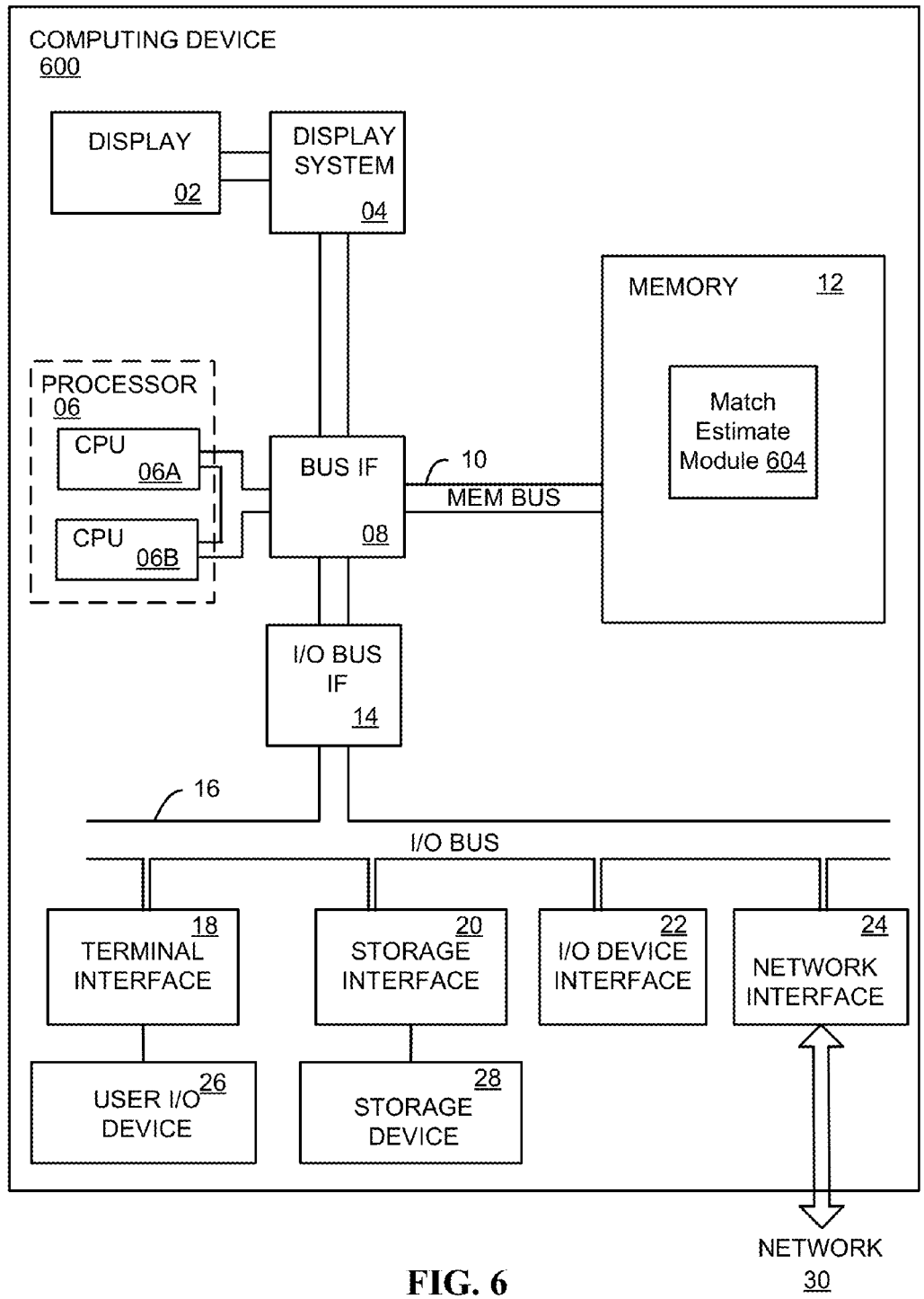
FIG. 6 is a block diagram of a computing device that includes a match estimate module, according to embodiments.

Consistent with some embodiments, the computing devices 102, 104 and/or 106 may be configured the same or analogous to the computing device 600, as illustrated in FIG. 6. In some computing environments, more or fewer computing devices and/or databases may be present than illustrated in FIG. 1. In some embodiments, the computing device 102 represents a client computing device and the computing devices 106 and/or 104 represent separate server computing devices. Accordingly, the client computing device may request a service or resource from the server computing device(s), which executes or completes the client request. In some embodiments, some or each of the components (e.g., the computing device 106 and the computing device 104) of the computing environment 100 represent single compute instances of a single computing device (e.g., computing components within a chassis, a blade server within a blade enclosure, an I/O drawer, a processor chip, etc.), as opposed to separate computing devices.

As illustrated in FIG. 1, the computing device 102 in some embodiments may include a match estimate module 130. The match estimate module 130 may be program instructions and when coupled with a processor(s) is configured to at least compare the structural information of a database (e.g., the DB structure component list 112A of database 112) with one or more software signatures (e.g., within the software DB signature data store 110) in order to determine what software product a particular database belongs to, which is described in more detail below. The term "structural information" or database "structure" as described herein may refer to particular physical/logical attributes that describe or represent a database and/or a database's physical/logical components, such as data object(s) within a database. For example, structural information may include information about data structures such as: a schema structure (e.g., a representation of how data is organized), table structure (e.g., the names and order of each table), column structure (e.g., the names and order of each column), and/or key information (e.g., the name of primary and/or foreign keys) of a particular database.

The term "software signature," as described herein may refer to some or each of the components or elements that makeup/are included in a program or software product. In some embodiments, a software signature may effectively be a "fingerprint" or "token" of a software or program product. A "fingerprint" may utilize an algorithm that maps a relatively large data item (e.g., an entire program product) into a much shorter bit string (e.g., the fingerprint), which uniquely identifies the program or software product. The shorter bit string may represent one or more units of information that makeup the program product (e.g., an OS of the program product, structural information about a database the program product, etc.). In some embodiments, the software signature(s) include a software identity (e.g., name) that is mapped to one or more database structure identities included within a program, which is described in more detail below. In some embodiments, each software signature represents a particular database record or groups of records with various attributes that link particular software products to databases and database structure features, as described in more detail below.

In some embodiments, the software DB signature data store 110, the database 114, and/or the database 112 represent individual servers (e.g., database servers) or a database management system utilized to process and access the actual data within a storage device (e.g., disk or Random Access Memory (RAM)) of the respective computing devices. The software DB signature data store 110 may be a data store that includes each software signature. The database 114 may be a particular database (e.g., a Structured Query Language (SQL) database) that is coupled to the computing device 106 (e.g., via shared memory). The DB structure component list 114A may include the structural information of the database 114.

The database 112 may also be a particular database that is coupled to the computing device 104. The DB structure component list 112A may also include the structural information of the database 112. In some embodiments, the DB structure component list 112A and/or 114A may be fingerprints or signatures for their respective databases such that when trying to determine database structures of a database, it may easily be identifiable via the fingerprint (e.g., a database manager does not have to scan an entire database to obtain structure components). In alternative embodiments, the DB structure component list 112A and/or 114A may represent a consolidated list of structural information after each database manager of a database (e.g., database 114) has scanned the database to retrieve the structural information in response to a particular request.

The computing devices 102, 104 and/or 106 may communicate with another via any suitable network 108. For example, the network 108 may represent a local area network (LAN), a general wide area network (WAN), a cellular network, and/or a public network (e.g., the Internet).

In some embodiments, FIG. 1 illustrates that a user 120 (e.g., an administrator) may be desirous to query the databases 114 and/or 116 in order to determine what particular program the DB structure component list 114A and/or 112A belongs to, which is described in more detail below. In other embodiments, automated functions may be performed as a background task (e.g., without the user 120 requesting information), such that upon detection of an event, one or more operations may be performed, as described in more detail below.

Figure 2:
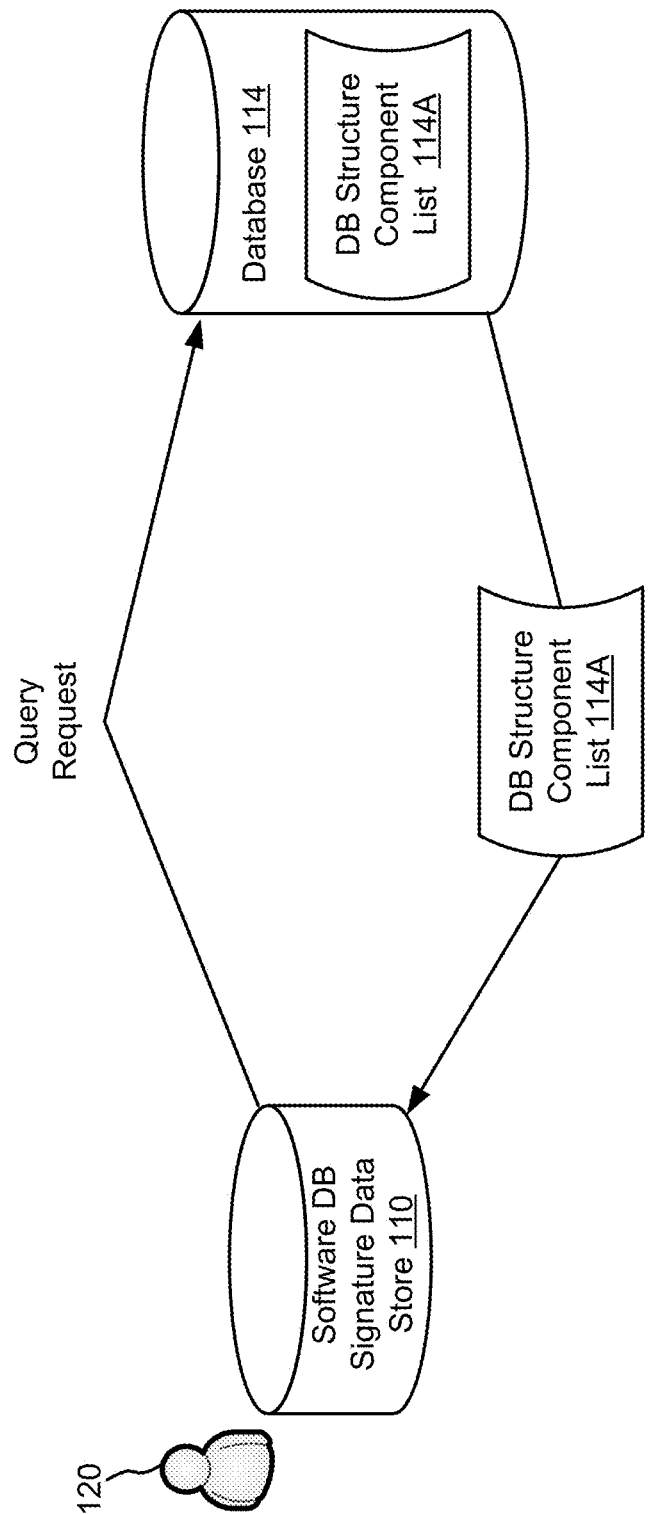
FIG. 2 is a diagram illustrating how structural information of a database may be obtained and compared with a software signature, according to embodiments.

FIG. 2 is a diagram illustrating how structural information of a database may be obtained and compared with a software signature, according to embodiments. In some embodiments, as illustrated in FIG. 2, the user 120 may send a query request to the database 114 to obtain the structural information of the database 114. For example, after establishing a wireless connection with the computing device 106, the user 120 may manually enter a query statement (e.g., SELECT attribute list FROM table list WHERE condition) on the computing device 102 to request one or more database structure information of database 114. The database manager of the database 114 may then scan the database 114 in order to provide the DB structure component list 114A according to the query request. Alternatively, the DB structure component list 114A may be a pre-formed list or fingerprint such that the database manager does not have to scan the database 114 to obtain structural information, but may identify and select the DB structure component list 114A.

The query language may be any suitable language, such as structured query language (SQL) for relational databases, multidimensional expression (MDX) for multidimensional databases or online analytical procession (OLAP) databases, online transactional processing databases (OLTP), or any other language for any other database.

The computing device 106 of the database 114 may then transmit the DB structure component list 114A to the computing device 102 such that the DB structure component list 114A can then be compared (e.g., via the match estimate module 104) with the software signatures within the software DB signature data store 110 in order to infer that the database 114 is likely included in a particular software product or program, which is described in more detail below. Although FIG. 2 illustrates how structural information may be obtained from the database 114, it is to be understood that the same or analogous procedures can also occur to obtain structural information from the database 112 of FIG. 1.

Figure 3:
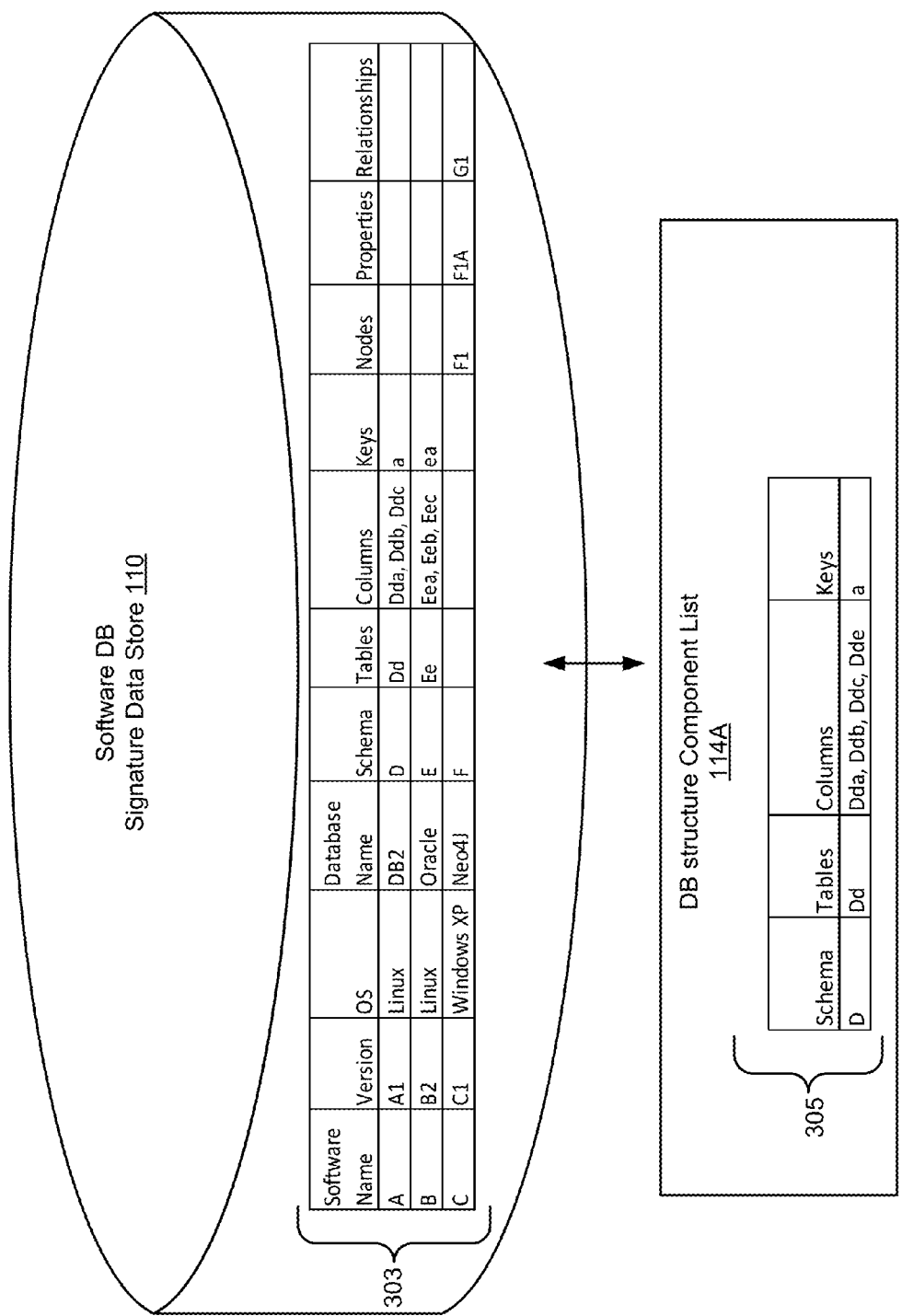
FIG. 3 is a diagram illustrating what a software signature and database structural information may include and how this information may be compared, according to embodiments.

FIG. 3 is a diagram illustrating what a software signature and database structural information may include and how this information may be compared, according to embodiments. FIG. 3 includes the software DB signature data store 110, which includes the table 303. FIG. 3 further includes the DB structure component list 114A, which includes the table 305. Although FIG. 3 illustrates that that only a particular data store (software DB signature data store 110) and list (DB structure component list 114A) include the tables 303 and 305, it is recognized that more data stores and lists may include identical or analogous tables to the tables 303 and 305. For example, database 112 of FIG. 1 may include within its DB structure component list 112A, a table identical or analogous to the table 305.

In embodiments, the table 303 represents a database table object with multiple columns (also known as fields or attributes) and records. In some embodiments, each record represents a software signature such that particular software identity (e.g., a name of a software product) is mapped to one or more associated database structure identities. For example, the first record includes software name "A" that is mapped to various other features via the other columns that are part of the first record (e.g., software A is mapped to schema D that includes tables Dd). Therefore, mapping may include that relationship between various columns within a single record (or series of records).

As illustrated in the table 303, the software signatures include various columns of data, such as "software Name," "Version," "OS" (operating system), "database name," "Schema," "Tables," "Columns," "Relations," "Node Types" and "Relation Type." A "software name" may be or include a name or identifier for a software product/program/application, etc. As disclosed herein, the terms "name" and/or "identifier" may refer to a string(s) and/or integer(s) that are associated with a particular attribute(s) (e.g., column). In an example illustration, the software name column may specify the name of a downloadable application (e.g., a personal taxes application). The "version" column may be or include a particular version of the software specified under the software name column. This column recognizes that there may be various iterations of a particular program product/application. For example, software name "A" may have versions A1, A2, and A3. The OS column may specify what operating system manages the software specified under the "software name" and/or "version" column. The "database name" column may specify the name or identifier of a database (e.g., DB2, Oracle, etc.) that the particular software includes or uses.

The rest of the columns of the table 303 may include various database structural information concerning the database specified under the "database name" column. The "Schema" column, for example, may describe how the data is organized within the particular database specified under the database name column. A database "schema" may specifically be a set of integrity constraints that are imposed on a database. In some embodiments, the "Schema" column or schema information may depict a graphical or logical representation of a database structure, the structure of which includes information concerning how each database object is related. For example, in a rational database, the schema may define or depict each table, field, relationship, view, index, package, procedure, function, queue, trigger, type, sequence, synonym, database link, and/or directory that is included in a particular database. In some embodiments, instead or in addition to graphically representing the schema, the "schema" column or schema information may include database language textual information in a data dictionary that describes database objects and/or relationships. Schema information may include information such as the number of tables, object, nodes, records, etc. in the database and the relationships between them. In an example illustration, the "schema column" may indicate that a first schema represents a "star" schema and that a second schema represents a "snowflake" schema.

The "table" column includes information about one or more tables of a database specified in the "database name" column. This information may include table structure information associated with a particular database table. For example, table structure information may include: the name or other identifier of a table, the number of columns that are within the table, etc. The "column" column specifies column structure information about one or more columns within the table specified under the "table" column. For example, column structure information may include a name or other identifier of one or more columns, the size constraints of one or more columns (e.g., column string width/length and/or number of bytes of data to be placed in one or more columns). For example, column size may define fixed string length (e.g., nchar) allowed for data entry into each column.

The "keys" column or other database structure information may specify structure information about keys (e.g., primary and/or foreign keys) for a particular column. A "primary" key may be a column that uniquely identifies each record and only one may exist per table. The structural information may include the name or identifier of the primary key attribute (e.g., "social security number"), the size of the key column, etc. A "foreign" key may be one or more columns in a first table that provides a link between data of a second table. For example, in a relational database, a foreign key from a first table may point to or refer to a primary key in a second table. The key column or database structural information may specifically include a name or identifier of the foreign key (column) for a particular table.

It is recognized that the table 303 may include structure information associated with various database types (e.g., relational databases, graph or other object oriented databases, hierarchical databases, network databases, online transaction processing (OLTP) databases, online analytical processing (OLAP) databases, etc.). For example, as illustrated in the table 303, there may the columns of "nodes," "relationships," and "properties," which may correspond to graph databases. An object-oriented database utilizes object-oriented programming languages and may include data (e.g., sound/video data and methods describing what to do with data) that is stored as objects, as opposed to storing strings or integers in two-dimensional arrays in tables that include rows and columns like in a relational database. Each one of these objects may belong to an object class. An object class may share one or more objects a common structure and/or behavior.

The "node" column may represent each name, identifier, or label (e.g., object) of each node, the size of the node, how many nodes exist, etc. For example, the label of a first node may be "person." The "properties" column may represent attributes or metadata associated with particular nodes, such as keys or key pairs. For example, using the illustration above, the first node labeled "person" may include "name: John," and "id: 1". The "relationships" column may specify how two particular nodes (e.g., a "start" node and "end" node) are related, which may be analogous to relational databases that utilize keys to demonstrate how two tables are related. The structural information that may be obtained is the name or identifier of the relationship, the direction of the relationship, etc. The name or identifier of the relationship may indicate a verb action associated with two nodes. For example, using the illustration above, the first node of "person," and key "John" may include a relationship named "works at," and that points or refers to a second node named "business," with a key named "supermarket A." Accordingly, these two nodes along with the relationship indicates that "John" "works at" "supermarket A."

In various embodiments, the table 303 (or table 305) includes more columns than illustrated in FIG. 3. For example, there may be more columns that correspond with more database types (e.g., hierarchical databases, network databases, online transaction processing (OLTP) databases, online analytical processing (OLAP) databases, etc.) depending on the software utilized. For example, the table 303 and/or 305 may include database structure information about a record (e.g., name) of a parent or child data object and/or a link in a hierarchical or network database. In some embodiments, there may be more columns in table 303 and/or 305 that include various other database structure type of information. For example, there may be structure information that includes information about indexes (e.g., name of index, type of index, organization or graphical layout of the index, record boundaries of the index, etc.), views, statistical information for query optimization (e.g., histogram specifications, bucket specifications), etc.

FIG. 3 also includes the DB structure component list 114A, which includes the structural information about database 114. The structural information is represented by the table 305. The table 305 includes column data about: "schema," "tables," "columns," and "keys." In embodiments, this header information (i.e., schema, tables, columns, keys) in table 305 may include the same or analogous types of information as discussed above for the table 303 for the software signatures (e.g., schema, tables, column, keys, etc.). For example, the "columns" column in table 305 may include a name or other identifier of one or more columns, the size constraints of one or more columns (e.g., column(s) string width/length and/or number of bytes of data to be placed in one or more columns) for the database 114, which may be the same type of information that the "columns" column in the table 303 includes as discussed above.

In some embodiments, the structural information in table 305 is compared to the software signatures in table 303 in order to determine what software product is associated with the DB structure component list 114A. For example, in some embodiments, each column of the table 305 may be compared to each record (software signature) of a corresponding database structure column within the table 303 (i.e., schema, tables, columns, keys, nodes, relationships, properties), and a first match estimate may be calculated for that record in a particular column (e.g., a percentage match). And then an inference may be made that the structure information in the table 305 is associated with a particular database.

In an example illustration, table 305 indicates that the schema of database 114 is D. When compared with the "schema" column of table 303, there is a match of 100% with the first record (corresponding to software A) because the schema is also D. However, there is a 0% match for the second and third records within table 303 because the schema for software B and C is schema E and F schema respectively. Likewise, the table 305 indicates that the database 114 includes the tables value of "Dd." When compared to the table values under the "tables" column of table 303, there is once again a 100% match associated with the first record because software A includes the tables value of "Dd." And again, there is a 0% match for Software B and C because these softwares include tables Ee and no tables respectively. Table 305 also indicates that the database includes the columns of "Dda," "Ddb" "Ddc" and "Dde." However, when comparing this to the "columns" column of table 303, there may not be a 100% match with any record. This may be because users may generate customized columns outside of a default databases setting. Accordingly, for the first record there may be a 75% match instead of a 100% match because the column of "Dde" of table 305 may have been added or customized by a particular user. There may also be a 0% match between the columns of table 305 and the second and third records (softwares B and C) of table 303. The "keys" column of table 305 may indicate that the database includes key "a" and when compared with the "keys" column of table 303 there may be a 100% match with software A (because of the "a" value), and a 0% percent match when compared with the second and third records. The table 305 illustrates that there is no structural components of the database 114 that are associated with nodes, relationships, or properties (i.e., graph databases). Accordingly, there may be a 0% match between the DB structure component list 114A and any record under the columns of "nodes," "relationships," and "properties," which indicates that the database 114 is not a graph database.

An inference can be made after all of these calculations to determine what particular software the database 114 belongs to. For example, given that there is a 100% match between each of the columns of the table 305 and each of the database structure columns for Software A of the table 303, except for the "columns" columns, and given that there is a 0% match between the table 305 and each of the records for softwares B and C for each column, it may be inferred that the database 114 includes structural components that are part of software product A, version A1, OS Linux, and database DB2. In some embodiments, the match estimate may include combining or scoring each individual percentage matching score (by the record and column as shown above) to generate a larger score. For example, for the first record (software A), given that there is a 100% match between the "schema," "tables," and "keys" columns and a 75% match of the "columns" column, a match estimate may indicate that the DB structure component list 114A matches up with software A's database at 93.75% (3.75/4), whereas there is a 0% match with softwares B and C.

In some embodiments, generating a match estimate may be or include dynamic scoring as opposed to statically calculating match percentages as described above. For example, given that it may be common for users to generate or customize their own columns outside of a default setting (e.g., columns "Dde"), this data may be weighted lower (prioritized lower) or include a score offset such that it is not as important of a factor when determining which product belongs to which database. Conversely, other data (e.g., schema, particular tables indicating database type) may be scored or weighted higher if it indicates that users cannot or have a small likelihood of changing data. For example, a user cannot change a data table of a relational database into a node of a graph database. Accordingly, schema information or database structure type may be weighted higher than individual data structures within a particular schema.

In some embodiments, the table 303 in the software DB signature data store 110 represents a self-referential logical database model where every single entity is stored in a single table (table 303), as opposed to multiple tables or other structures. In other embodiments however, the table 303 may be illustrative only for visualization purposes and may correspond to other database types. For example, the "schema," "tables," and "columns" columns may be included in a first table within a relational database and the "nodes," "relationships," and "properties" may correspond to a second table within the same relational database. In other embodiments, the table 303 may represent information as found in any other type of database such as a network database, a hierarchical database, object-oriented database, etc.

Figure 4:
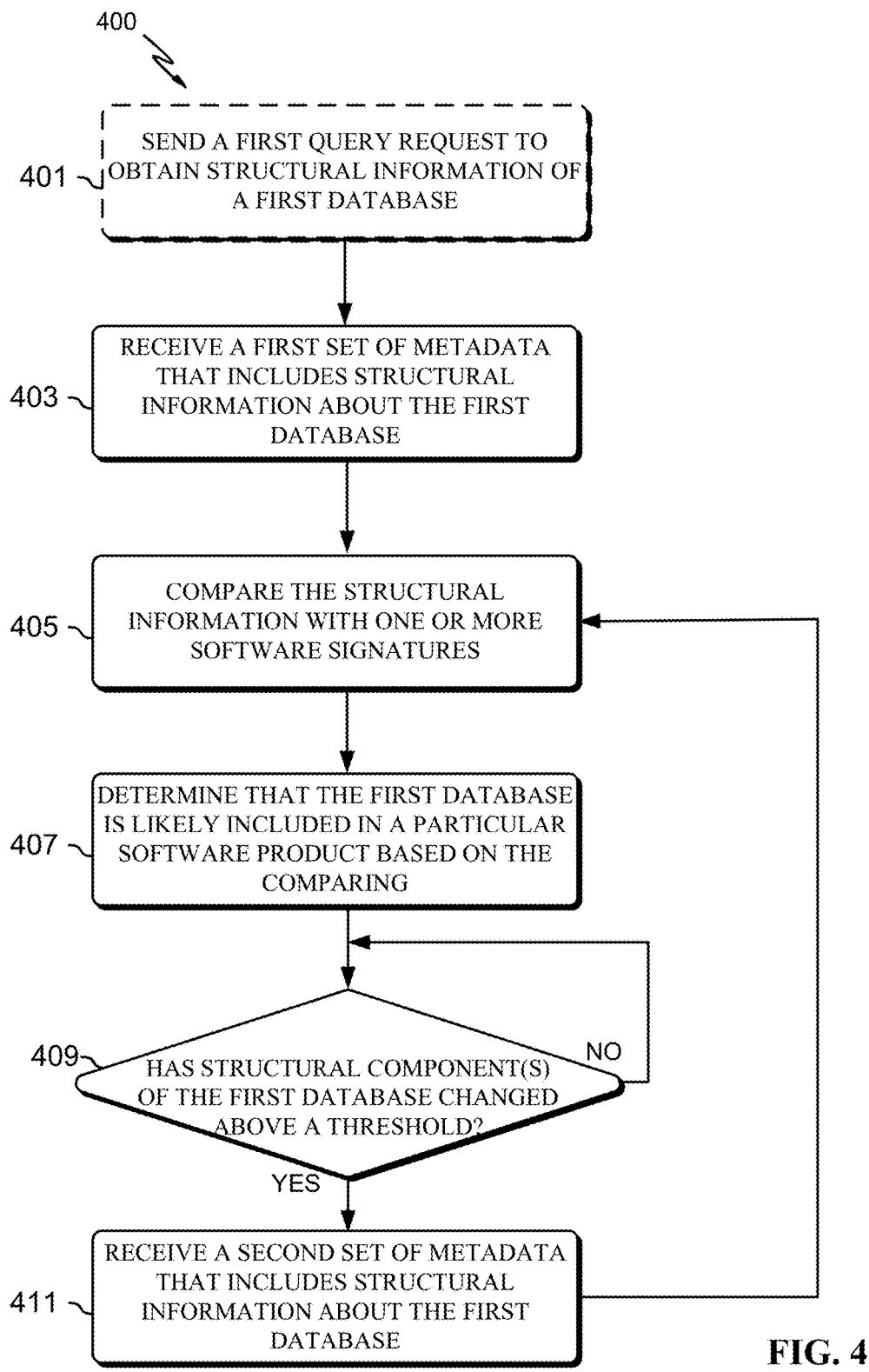
FIG. 4 is a flow diagram of an example process for determining that a database is likely included in a particular software product based on comparing structural information of the database with software signatures, according to embodiments.

FIG. 4 is a flow diagram of an example process 400 for determining that a database is likely included in a particular program or software product based on comparing structural information of the database with software signatures, according to embodiments. In some embodiments, the process 400 may begin per block 401 when a user (e.g., an administrator) sends a first query request to obtain structural information of or concerning a first database. The structural information may include any information as specified, for example, in FIG. 3 such as schema structure, table structure, column structure, etc. of the first database. In alternative embodiments, however, block 401 may not occur such that the receiving of a first set of metadata in block 403 may occur as an automated or background task (e.g., without a user request). For example, a computing device associated with the first database may include a counter that is set to transmit structural information concerning the first database every X period of time. Or the computing device associated with the first database may transmit the structural information based on a particular event, such as the structural components of the first database changing above a threshold, which is described in more detail below.

Per block 403, the first set of metadata may be received. The first set of metadata may include the structural information about the first database. In embodiments, the receiving of the first set of metadata may be in response to the query statement generated by a user in block 401 and the structural information may be initially located on a remote database. Accordingly, the receiving of the first set of metadata may be received via a network. For example, referring to FIG. 1, the user 120 may transmit a query request from the computing device 102 over the network 108 to obtain structural information from the database 112. The DB structure component list 112A may then responsively be transmitted back to the computing device 102 via the network 108.

Per block 405, the structural information of the first database may then be compared (e.g., by the match estimate module 104) with one or more software signatures. Each software signatures may include at least a software identity that is mapped to one or more database structure identities. For example, in FIG. 3, the software name of A is mapped to schema "D" and tables "Dd." via the table 303. In various embodiments, each software signature may include various other information about a particular software product and databases that are a part of the particular software product (e.g., name of software, version of software, database name included in the software, database structure such as schema, tables, keys, etc.). For example, each software signature may include some or all of the information as specified in FIG. 3.

In some embodiments, in addition, based on, or as part of the comparing function in block 405, a first match estimate may be generated (e.g., by the match estimate module 104). This first match estimate may be made in order to determine what software product the first database belongs to (or is a part of, is associated with, etc.). For example, as described in FIG. 3 above, each element of the DB structure component list 114 may be compared with each element of each particular software product's database to see how closely database structures (e.g., schema, tables, column, keys, etc.) match database structures for a particular software product. And based on this comparing of the structural information of the database 114 with the software signatures, a first match estimate may be generated.

Per block 407, it may be determined (or inferred) that the first database is likely included in (or belongs to) a particular software product based on the comparing (and/or generating of the match estimate). In other words, a particular software product or software identity associated the first database may be determined, ascertained, and/or confirmed based on the comparing of the structural information of the first database with the one or more software signatures.

Per block 409, it may be determined (e.g., by the first database) whether one or more structural components of the first database (corresponding to the structural information) has changed above a threshold (e.g., a table schema has changed, various table names have changed, etc.). For example, a software product may have been upgraded and the upgrade may include changes to the software product's database. Accordingly, a database manager may detect these changes and may be configured to transmit a message to an administrator's computing device when such changes over a threshold have been met. For example, in block 409 if the structural components of the first database have changed above a threshold, a computing device (e.g., computing device 104) may transmit information that indicates that one or more structural components of the first database have been changed above a threshold. The administrator's computing device (e.g., computing device 102) may then request, in response to the receiving of information that indicates that one or more structural components of the first database have changed above a threshold, a second set of metadata that includes structural information about the first database. In some embodiments, this request may be a query request by an administrator. In other embodiments, the request may be an automated task such that it may occur with or without an administrator query or permission.

Per block 411, the second set of metadata may be received that includes the structural information about the first database. Blocks 405 through 411 may then be repeated for the second set of metadata. For example, per block 405, a second match estimate may be generated based on comparing the structural information of the second set of metadata with the one or more software signatures. In some embodiments, at block 409, the structural components of the first database may have changed above a threshold, based on the receiving of the second set of metadata. Consequently, an update may be made to the determining (or inferring) that the first database is likely included in a first software product by determining (or inferring) that the first database is likely included in a second software product based on the generating of the second match estimate or comparing. For example, as discussed above, a software product A1 may have been updated to A2, which may be considered a different program or software product. The reflection of this update may cause the program's database structural features to change. An administrator may take not of this database structure change and try to map the change to the change in program product as described above.

Figure 5:
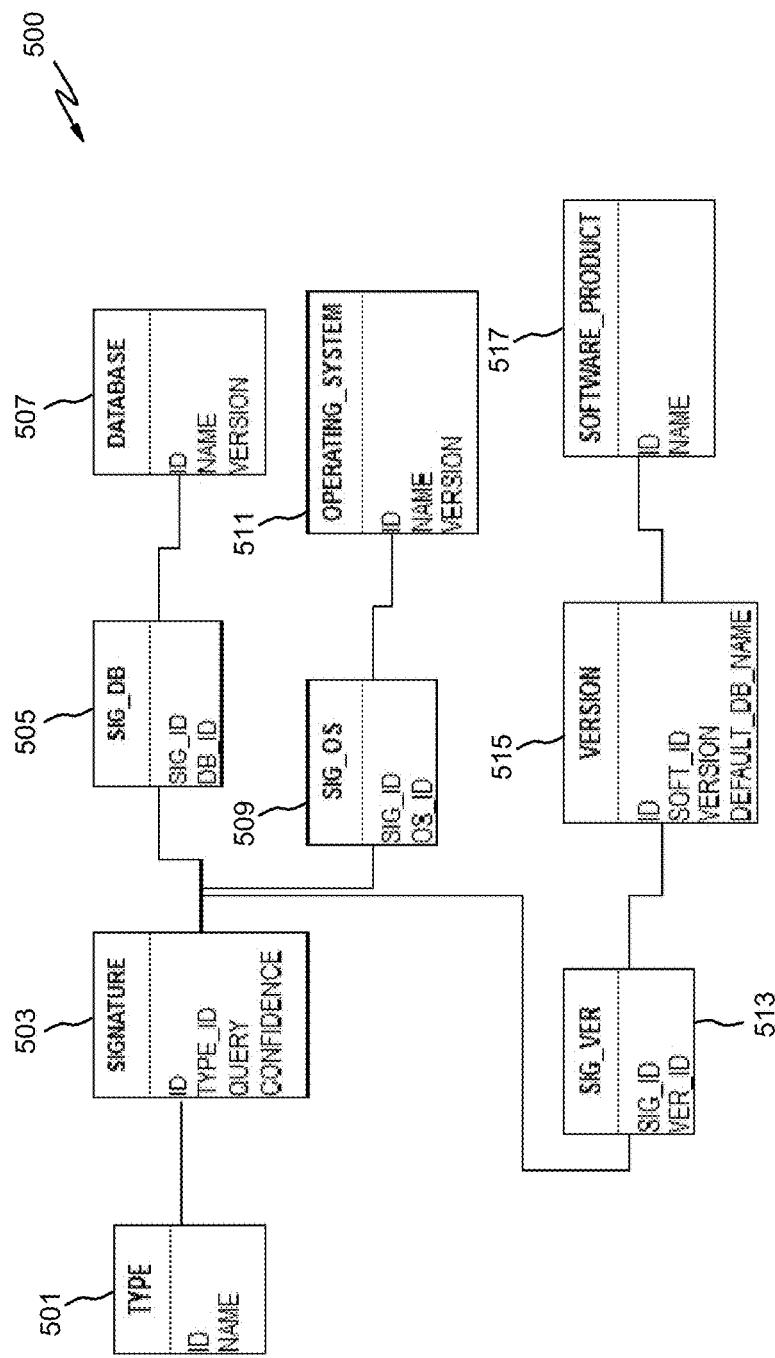
FIG. 5 is a diagram illustrating how a software signature may be represented, according to embodiments.

FIG. 5 is a diagram illustrating how a software signature may be represented, according to embodiments. In some embodiments, instead of or in addition to the table 303 as described in FIG. 3, software signatures may be represented by the schema 500 as illustrated in FIG. 5. For example, the schema 500 may represent a relational database that includes various tables (relations) of data—501, 503, 505, 507, 509, 511, 513, 515, 517. The schema 500 also illustrates how each table is related (e.g., via the lines that link a primary key in one table to a foreign key in another table).

The "TYPE" Table 501 represents a database language type for different databases that may be present on a source database (e.g., a database an administrator is working with). For example, the database language type may be Structured Query Language (SQL) (associated with relational databases), a Non-SQL (NoSQL) (associated with non-relational databases, such as graph databases), etc. The primary key of table 501 may be the "ID." The "NAME" data may specify the name of the database (e.g., SQL).

The "SIGNATURE" table 503 represents a software signature, which includes some or all of the data from each of the other tables—table 501, 505, 507, 509, 511, 513, 515, and/or 517. For example, the table 503 may include the "TYPE_ID" foreign key, which may be the primary key of the "TYPE" table 501. The table 503 may also include "QUERY" and "CONFIDENCE" data that includes information about the signature query and confidence of the signature query.

The "SIG_DB" (signature database) table 505 illustrates a signature (e.g., an ID, hash, string, alphanumeric text) that represents a database type. The primary key may be "SIG_ID" (signature ID) and the foreign key may be "DB_ID" (database ID), which corresponds to the "DATABASE" table 507's primary key. The "DATABASE" table 507 may include information about a database type (e.g., DB2, Informix, etc.). In embodiments, the table 507 may correspond to the information an administrator may input about a particular database that he/she has access to. The Primary key may be the "ID" and the table 507 may specifically include "NAME" field that specifies the name of a database for each record (e.g., DB2) and a "VERSION" field that specifies a version of the database name (e.g., DB2 version 5.0).

The "SIG_OS" (signature operating system) table 509 illustrates a signature that represents an operating system type (e.g., of a particular software product). The primary key may be "SIG_ID" and the foreign key may be "OS_ID," which corresponds to the "OPERATING SYSTEM" table 511's primary key. The "OPERATING SYSTEM" table 511 may include information about an operating system type (e.g., WINDOWS, RED HAT LINUX, etc.). The primary key of 511 may be "ID" and the table 511 may specifically include a "NAME" field (e.g., LINUX) and a version field (e.g., RED HAT ENTERPRISE LINUX Server Release 5).

The "SIG_VER" (signature version) table 513 illustrates a signature that represents a software product version. The primary key may be "SIG_ID" and the foreign key may be "VER_ID" (version ID), which corresponds to the "VERSION" table 515's primary key. The "VERSION" table 515 may include information about a version of a particular software product. The table 515 may include a primary key field of "ID" and have a foreign key field of "SOFT_ID" (software ID), which may correspond to the primary key of the "SOFTWARE PRODUCT" table 717. The table 515 may also include a "VERSION" field and a "DEFAULT_DB_NAME" field. The "SOFTWARE PRODUCT" table 517 may include information about a software product. The table 517 may include a primary key of "ID" and another field of "NAME," which specifies the name of a particular software product.

In an example illustration of how a software signature may be derived, a database administrator may desire to know what software product is associated with a database he/she is working with. Accordingly, the administrator may input a query to the database that specifies the name and version of a particular database and/or anything within the DB structure component list 114A of FIG. 3 (e.g., tables, columns, etc.). The database manager of that database may then responsively fetch one or more records within the table to execute the query.

This query from the administrator may then be matched to a particular software product associated with the schema 500. The table 503 may include the "QUERY" from the administrator, which may correspond to one or more record values for a particular set of fields or columns that the administrator chose for the query. For example, a first record may include values associated with the query under a "table" column (e.g., Dd) and under a "column" column (e.g., Dda). The first record may also include or be associated with other values that correspond to the particular software product (e.g., information derived from the tables 509, 511, 513, 515, and/or 517). A matching estimate or "CONFIDENCE" may be performed the same as or analogous to the matching of the DB structure component list 114A and table 303 of FIG. 3. In some embodiments, table 503 of FIG. 5 represents or includes the information in the table 303 of FIG. 3. In some embodiments, any process or operation performed as described in FIG. 3 can also be performed for FIG. 5.

FIG. 6 is a block diagram of a computing device 600 that includes a match estimate module 604, according to embodiments. The components of the computing device 600 can include one or more processors 06, a memory 12, a terminal interface 18, a storage interface 20, an Input/Output ("I/O") device interface 22, and a network interface 24, all of which are communicatively coupled, directly or indirectly, for inter-component communication via a memory bus 10, an I/O bus 16, bus interface unit ("IF") 08, and an I/O bus interface unit 14.

The computing device 600 may include one or more general-purpose programmable central processing units (CPUs) 06A and 06B, herein generically referred to as the processor 06. In an embodiment, the computing device 600 may contain multiple processors; however, in another embodiment, the computing device 600 may alternatively be a single CPU device. Each processor 06 executes instructions stored in the memory 12 (e.g., the affinity module 518 and the failover module 520 instructions).

The computing device 600 may include a bus interface unit 08 to handle communications among the processor 06, the memory 12, the display system 04, and the I/O bus interface unit 14. The I/O bus interface unit 14 may be coupled with the I/O bus 16 for transferring data to and from the various I/O units. The I/O bus interface unit 14 may communicate with multiple I/O interface units 18, 20, 22, and 24, which are also known as I/O processors (IOPs) or I/O adapters (IOAs), through the I/O bus 16. The display system 04 may include a display controller, a display memory, or both. The display controller may provide video, audio, or both types of data to a display device 02. The display memory may be a dedicated memory for buffering video data. The display system 04 may be coupled with a display device 02, such as a standalone display screen, computer monitor, television, a tablet or handheld device display, or another other displayable device. In an embodiment, the display device 02 may include one or more speakers for rendering audio. Alternatively, one or more speakers for rendering audio may be coupled with an I/O interface unit. In alternate embodiments, one or more functions provided by the display system 04 may be on board an integrated circuit that also includes the processor 06. In addition, one or more of the functions provided by the bus interface unit 08 may be on board an integrated circuit that also includes the processor 06.

The I/O interface units support communication with a variety of storage and I/O devices. For example, the terminal interface unit 18 supports the attachment of one or more user I/O devices, which may include user output devices (such as a video display devices, speaker, and/or television set) and user input devices (such as a keyboard, mouse, keypad, touchpad, trackball, buttons, light pen, or other pointing devices). A user may manipulate the user input devices using a user interface, in order to provide input data and commands to the user I/O device 26 and the computing device 600, may receive output data via the user output devices. For example, a user interface may be presented via the user I/O device 26, such as displayed on a display device, played via a speaker, or printed via a printer.

The storage interface 20 supports the attachment of one or more disk drives or direct access storage devices 28 (which are typically rotating magnetic disk drive storage devices, although they could alternatively be other storage devices, including arrays of disk drives configured to appear as a single large storage device to a host computer, or solid-state drives, such as a flash memory). In another embodiment, the storage device 28 may be implemented via any type of secondary storage device. The contents of the memory 12, or any portion thereof, may be stored to and retrieved from the storage device 28 as needed. The storage devices 28 may be employed to store any of the databases described herein, including databases 110, 112, and 114. The I/O device interface 22 provides an interface to any of various other I/O devices or devices of other types, such as printers or fax machines. The network interface 24 provides one or more communication paths from the computing device 600 to other digital devices and computer systems.

Although the computing device 600 shown in FIG. 6 illustrates a particular bus structure providing a direct communication path among the processors 06, the memory 12, the bus interface 08, the display system 04, and the I/O bus interface unit 14, in alternative embodiments the computing device 600 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 14 and the I/O bus 08 are shown as single respective units, the computing device 600, may include multiple I/O bus interface units 14 and/or multiple I/O buses 16. While multiple I/O interface units are shown, which separate the I/O bus 16 from various communication paths running to the various I/O devices, in other embodiments, some or all of the I/O devices are connected directly to one or more system I/O buses.

In various embodiments, the computing device 600 is a multi-user mainframe computer system, a single-user system, or a server computer or similar device that has little or no direct user interface, but receives requests from other computer systems (clients). In other embodiments, the computing device 600 may be implemented as a desktop computer, portable computer, laptop or notebook computer, tablet computer, pocket computer, telephone, smart phone, or any other suitable type of electronic device.

In an embodiment, the memory 12 may include a random-access semiconductor memory, storage device, or storage medium (either volatile or non-volatile) for storing or encoding data and programs. In another embodiment, the memory 12 represents the entire virtual memory of the computing device 600, and may also include the virtual memory of other computer systems coupled to the computing device 600 or connected via a network 30. The memory 12 may be a single monolithic entity, but in other embodiments the memory 12 may include a hierarchy of caches and other memory devices. For example, memory may exist in multiple levels of caches, and these caches may be further divided by function, so that one cache holds instructions while another holds non-instruction data, which is used by the processor. Memory 12 may be further distributed and associated with different CPUs or sets of CPUs, as is known in any various so-called non-uniform memory access (NUMA) computer architectures.

The memory 12 may store all or a portion of the components and data (e.g., match estimate module 604) shown in FIG. 6. These programs and data are illustrated in FIG. 6 as being included within the memory 12 in the computing device 600; however, in other embodiments, some or all of them may be on different computer systems and may be accessed remotely, e.g., via a network 30. The computing device 600 may use virtual addressing mechanisms that allow the programs of the computing device 600 to behave as if they only have access to a large, single storage entity instead of access to multiple, smaller storage entities. Thus, while the components and data shown in FIG. 6 are illustrated as being included within the memory 12, these components and data are not necessarily all completely contained in the same storage device at the same time. Although the components and data shown in FIG. 6 are illustrated as being separate entities, in other embodiments some of them, portions of some of them, or all of them may be packaged together.

In embodiments, the components and data shown in FIG. 6 may include instructions or statements that execute on the processor 06 or instructions or statements that are interpreted by instructions or statements that execute on the processor 06 to carry out the functions as described above. For example, the match estimate module 604 may be program instructions that when execute on the processor 06 to perform some or all of the blocks in FIG. 4, FIG. 5 (or any other operation described herein). In another embodiment, the components shown in FIG. 6 may be implemented in hardware via semiconductor devices, chips, logical gates, circuits, circuit cards, and/or other physical hardware devices in lieu of, or in addition to, a processor-based system. In an embodiment, the components shown in FIG. 6 may include data in addition to instructions or statements.

FIG. 6 is intended to depict representative components of the computing device 600. Individual components, however, may have greater complexity than represented in FIG. 6. In FIG. 6, components other than or in addition to those shown may be present, and the number, type, and configuration of such components may vary. Several particular examples of additional complexity or additional variations are disclosed herein; these are by way of example only and are not necessarily the only such variations. The various program components illustrated in FIG. 6 may be implemented, in various embodiments, in a number of different ways, including using various computer applications, routines, components, programs, objects, modules, data pages etc., which may be referred to herein as "software," "computer programs," or simply "programs."

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for determining a software identity based on a database structure, the method comprising:
   receiving, by a computing device and via a network, a first set of metadata that includes structural information about a first database;
   comparing, by the computing device, the structural information with one or more software signatures, each software signature including a first field specifying a software identity and one or more second fields specifying one or more associated database structure features such that the software identity is mapped to the one or more associated database structure features;
   generating, by the computing device, a first match estimate based on the comparing of the structural information with the one or more software signatures; and
   inferring, by the computing device, that the first database is likely included in a first software product based on the generating of the first match estimate.

2. The method of claim 1, wherein the one or more second fields of each software signature include one or more fields selected from a group consisting of: a schema structure of a second database, a table structure of the second database, a column structure of the second database, and a key structure of the second database.

3. The method of claim 1, wherein the generating a match estimate includes calculating a percentage that a first set of data derived from each table column of the first database matches a second set of data derived from each table column of a second database, the second database including the one or more software signatures.

4. The method of claim 1, wherein the structural information of the first database includes one or more units of data from a group consisting of: a schema structure of the first database, a table structure of the first database, a column structure of the first database, a key structure of the first database.

5. The method of claim 1, further comprising:
   receiving information indicating that one or more structural components of the first database has changed above a threshold;
   requesting, as an automated task and in response to the receiving of information indicating that one or more structural components of the first database has changed above a threshold, a second set of metadata that includes structural information about the first database; and
   comparing the structural information of the second set of metadata with the one or more software signatures.

6. The method of claim 5, further comprising:
   generating a second match estimate based on the comparing of the structural information of the second set of metadata with the one or more software signatures; and
   updating the inferring that the first database is likely included in the first software product by inferring that the first database is likely included in a second software product based on the generating of the second match estimate.

7. The method of claim 1, wherein the structural information about the first database is a fingerprint of the first database having one or more fields identifying structure components of the first database.

8. A system comprising:
   a computing device having a processor; and
   a computer readable storage medium having program instructions embodied therewith, the program instructions readable/executable by the processor to cause the system to perform a method, the method comprising:
   receiving, via a network, metadata that includes structural information about a first database;
   comparing the structural information with one or more software signatures, each software signature including a first field specifying a software identity and one or more second fields specifying one or more associated database structure features such that the software identity is mapped to the one or more associated database structure features;
   generating a first match estimate in order to determine what software product the first database belongs to, the generating being based on the comparing of the structural information with the one or more software signatures; and
   determining that the first database likely belongs to a first software product, the determining being based on the generating of the first match estimate.

9. The system of claim 8, wherein the one or more second fields of each software signature include one or more fields selected from a group consisting of: a schema structure of a second database, a table structure of the second database, a column structure of the second database, and a key structure of the second database.

10. The system of claim 8, wherein the generating a first match estimate includes calculating a percentage that a first set of data derived from each table column of the first database matches a second set of data derived from each table column of a second database, the second database including the one or more software signatures.

11. The system of claim 8, wherein the structural information of the first database includes one or more units of data from a group consisting of: a schema structure of the first database, a table structure of the first database, a column structure of the first database, a key structure of the first database.

12. The system of claim 8, the method further comprising:
   receiving information indicating that one or more structural components of the first database has changed above a threshold;
   requesting, as an automated task and in response to the receiving of information indicating that one or more structural components of the first database has changed above a threshold, a second set of metadata that includes structural information about the first database; and
   comparing the structural information of the second set of metadata with the one or more software signatures.

13. The system of claim 12, the method further comprising:
   generating a second match estimate based on the comparing of the structural information of the second set of metadata with the one or more software signatures; and updating the determining that the first database likely belongs to a first software product by determining that the first database likely belongs to a second software product based on the generating of the second match estimate.

14. The system of claim 8, wherein the structural information about the first database is a fingerprint of the first database having one or more fields identifying structure components of the first database.

15. A computer program product comprising a non-transitory computer readable storage medium having program code embodied therewith, the program code executable/readable by a computing device to:
   receive metadata indicating structural information of a first database;
   compare the structural information with one or more software signatures, each software signature including a first field specifying a software identity and one or more second fields specifying one or more associated database structure features such that the software identity is mapped to the one or more associated database structure features; and
   determine a first software identity that is associated with the first database, the determining being based on the comparing of the structural information with the one or more software signatures.

16. The computer program product of claim 15, the one or more second fields of each software signature include one or more fields selected from a group consisting of: a schema structure of a second database, a table structure of the second database, a column structure of the second database, and a key structure of the second database.

17. The computer program product of claim 15, wherein the comparing includes generating a match estimate by calculating a percentage that a first set of data derived from each table column of the first database matches a second set of data derived from each table column of a second database, the second database including the one or more software signatures.

18. The computer program product of claim 15, wherein the structural information of the first database includes one or more units of data from a group consisting of: a schema structure of the first database, a table structure of the first database, a column structure of the first database, a key structure of the first database.

19. The computer program product of claim 15, wherein the program code is further executable/readable by the computing device to:
   receive information indicating that one or more structural components of the first database has changed above a threshold;
   request, as an automated task and in response to the receiving of information indicating that one or more structural components of the first database has changed above a threshold, a second set of metadata that includes structural information about the first database; and
   compare the structural information of the second set of metadata with the one or more software signatures.

20. The computer program product of claim 19, wherein the program code is further executable/readable by the computing device to:
   compare the structural information of the second set of metadata with the one or more software signatures; and
   update the determining the first software identity that is associated with the first database by determining a second software identity that is associated with the first database, the determining a second software identity being based on the comparing the structural information of the second set of metadata with the one or more software signatures.

* * * * *